(12) United States Patent
Ochi et al.

(10) Patent No.: US 8,589,967 B2
(45) Date of Patent: Nov. 19, 2013

(54) OPTICAL PICKUP

(75) Inventors: Manabu Ochi, Hitachinaka (JP);
Katsuhiko Kimura, Kasumigaura (JP);
Hidenao Saito, Yokohama (JP)

(73) Assignee: Hitachi Media Electronics Co., Ltd., Iwate (JP)

(*) Notice: Subject to any disclaimer, the term of this patent is extended or adjusted under 35 U.S.C. 154(b) by 0 days.

(21) Appl. No.: 13/435,618

(22) Filed: Mar. 30, 2012

(65) Prior Publication Data

US 2013/0086600 A1 Apr. 4, 2013

(30) Foreign Application Priority Data

Sep. 30, 2011 (JP) .................................. 2011-217587

(51) Int. Cl.
*G11B 7/09* (2006.01)
(52) U.S. Cl.
USPC .......................................................... 720/686
(58) Field of Classification Search
USPC .......................................................... 720/686
See application file for complete search history.

(56) References Cited

U.S. PATENT DOCUMENTS

| | | | |
|---|---|---|---|
| 5,841,593 A | 11/1998 | Ikegame et al. | |
| 6,665,238 B2 | 12/2003 | Ijima et al. | |
| 6,904,607 B2 * | 6/2005 | Wada | 720/684 |
| 7,308,752 B2 * | 12/2007 | Tanaka | 29/603.1 |
| 7,461,390 B2 * | 12/2008 | Usami et al. | 720/681 |
| 7,644,421 B2 * | 1/2010 | Nakagawa | 720/685 |
| 7,800,985 B2 * | 9/2010 | Matozaki et al. | 369/44.16 |
| 7,877,763 B2 * | 1/2011 | Nakagaki | 720/682 |
| 7,933,174 B2 * | 4/2011 | Satou et al. | 369/44.15 |
| 8,040,763 B2 * | 10/2011 | Matozaki et al. | 369/44.14 |
| 2005/0111311 A1 | 5/2005 | Funakoshi | |

FOREIGN PATENT DOCUMENTS

| | | |
|---|---|---|
| JP | 07-006388 A | 1/1995 |
| JP | 11-265516 A | 9/1999 |
| JP | 2001-344784 A | 12/2001 |
| JP | 2003-346367 A | 12/2003 |
| JP | 2005-004826 A | 1/2005 |
| JP | 2005-116062 A | 4/2005 |
| JP | 2009-217863 A | 9/2009 |

\* cited by examiner

*Primary Examiner* — Mark Blouin
(74) *Attorney, Agent, or Firm* — Mattingly & Malur, PC

(57) ABSTRACT

An optical pickup includes an object lens; a moving part including the object lens and coils; rod-shaped support members disposed in a focusing direction, one end of each of the support members being attached to side surfaces of the moving part in a tracking direction; a fixing part for fixing the other end of each of the support members; a yoke including magnets; and gel holding parts, each of the gel holding parts including walls on both sides of the support members in the tracking direction, and the support members being disposed on both sides of the moving part in the tracking direction. Each of the gel holding parts includes an opening at one end on an optical disc side in the focusing direction and includes a cutout in the wall farther from the object lens in the tracking direction, the cutout extending from an edge of the opening.

4 Claims, 5 Drawing Sheets

OPTICAL PICKUP

CLAIM OF PRIORITY

The present application claims priority from Japanese Patent Application JP 2011-217587 filed on Sep. 30, 2011, the content of which is hereby incorporated by reference into this application.

FIELD OF THE INVENTION

The present invention relates to an optical pickup for driving an object lens in the focusing direction and the tracking direction and aligning the position of a focal point of the object lens to a target track on a recording surface of an optical disc in order to read information recorded on the recording surface of the optical disc or to write information on the recording surface of the optical disc.

BACKGROUND OF THE INVENTION

One of the conventional technologies of the field of the invention is disclosed in Japanese Unexamined Patent Application Publication No. 2003-346367. This document discloses an object lens actuator including gel holding parts in which gel for a damper is poured into gaps between a fixing part which support members are attached to and a bent parts which are formed by bending the both ends of a yoke in the tracking direction so as to stand the ends in the focusing direction.

The abstract of this document says that an object lens actuator device can be provided which easily forms the gel holding parts which the gel is poured into.

Another conventional technology is disclosed in Japanese Unexamined Patent Application Publication No. 11-265516. This document discloses an optical pickup in which openings including taper parts and grooves are formed in a fixing part which the support members are attached to for respective support members, and gel holding parts which gel for a damper is poured into are formed in the positions adjacent to the respective grooves.

This document says that an optical pickup can be provided which facilitates pouring of the gel and prevents variation of pouring.

According to the technology in Japanese Unexamined Patent Application Publication No. 2003-346367, it is difficult to visually confirm a defect that the gel does not reach the lowest of the support members disposed in the focusing direction because the inside of the gel holding part is visible only from the optical disc side in the focusing direction. In this case, the amplitude of the translational mode of a moving part, which is decided by the rigidity of the support members and the mass of the moving part, may not be sufficiently damped and setting of the servo gain, which is for making the position of the object lens follow axial and radial run-out of the optical disc, may become difficult.

According to the technology in Japanese Unexamined Patent Application Publication No. 11-265516, gel is partitioned by walls forming the gel holding parts because the gel holding parts which the gel is poured into are equipped for respective support members. In this case, it possibly takes time for assembling because a gel applying step and an irradiation with ultraviolet light step are required. In the gel applying step, gel applying should be performed at least the times equal to the number of the support members. In the irradiation with ultraviolet light step, in order to harden the surface of the gel, irradiation should be performed from both sides in the tracking direction or performed for each side at least two times changing the posture of the fixing part.

The object of the present invention is to provide an optical pickup for reducing the cost and variation of the performance by achieving both of simplification of assembling and reduction of variation in the applying condition of the gel.

SUMMARY OF THE INVENTION

The above object is achieved by the following optical pickup. An optical pickup includes an object lens for forming a laser spot on a recording surface of an optical disc; a moving part including a lens holder which the object lens and coils are attached to; a plurality of rod-shaped support members disposed in a focusing direction, one end of each of the support members being attached to each of side surfaces of the moving part in a tracking direction; a fixing part for fixing the other end of each of the support members; magnets disposed facing the coils; a yoke which the magnets are attached to; and gel holding parts, each of the gel holding parts including walls on both sides of the support members in the tracking direction, and the support members being disposed on both sides of the moving part in the tracking direction, wherein each of the gel holding parts includes an opening at one end on an optical disc side in the focusing direction and includes a cutout in the wall which is located farther from the object lens in the tracking direction, the cutout extending from an edge of the opening.

It is preferable that the gel holding parts are integrated in the yoke at both ends of the yoke in the tracking direction.

It is also preferable that the gel holding parts are integrated in the fixing part at both ends of the fixing part in the tracking direction.

It is also preferable that a distance between a bottom surface of the cutout and the optical disc is longer than a distance between the optical disc and one of the support members which is located farthest away from the optical disc in the focusing direction.

According to the present invention, an optical pickup for reducing the cost and variation of the performance by achieving both of simplification of assembling and reduction of variation in the applying condition of the gel can be provided.

DETAILED DESCRIPTION OF THE PREFERRED EMBODIMENTS

Below, embodiments of the present invention will be described with reference to the drawings.

[First Embodiment]

In the present embodiment, an optical pickup will be described which drives an object lens in the focusing direction and the tracking direction and aligns the position of a focal point of the object lens to a target track on a recording surface of an optical disc in order to read information recorded on the recording surface of the optical disc or to write information on the recording surface of the optical disc.

First, the optical pickup will be described referring to FIG. 6.

Figure 6:
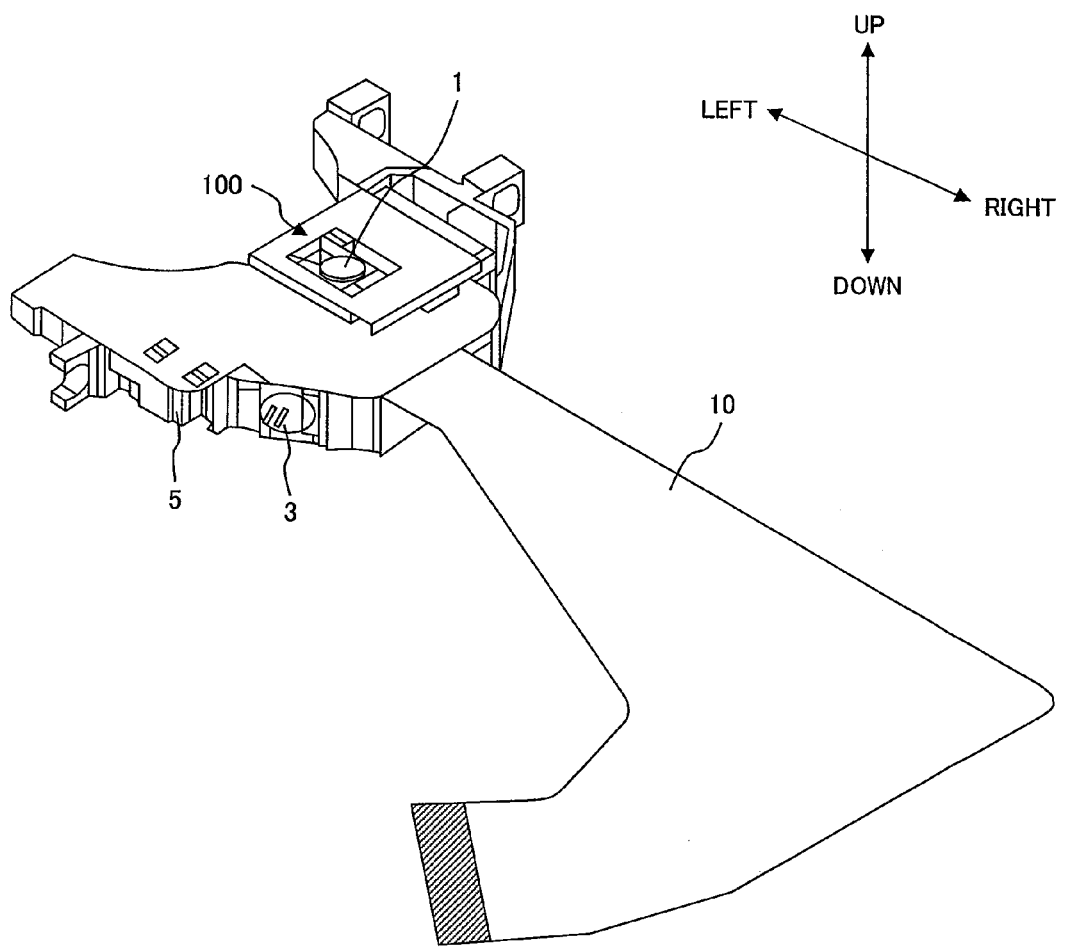
FIG. 6 is a schematic view of the optical pickup in accordance with the first embodiment of the present invention.

FIG. 6 is a schematic view of an optical pickup in accordance with the first embodiment of the present invention.

In FIG. 6, directions are defined such that a direction in which an object lens 1 moves toward an optical disc (not illustrated) is up, and a direction in which the object lens 1 moves away from the optical disc is down. This up and down direction (vertical direction), which is indicated in FIG. 6, is the focusing direction. Right and left direction indicated in FIG. 6 is the tracking direction.

The optical pickup includes an optical system, an object lens actuator 100, and a flexible printed circuit board 10. The optical system includes a laser diode 3 which is a light source, the object lens 1 for focusing an outgoing light onto a recording surface of the optical disc, optical elements for detecting and generating an error signal for control, a photo-detector 5 for converting variation of the reflected light from the optical disc to an electric signal. The object lens actuator 100 is a mechanism for aligning the position of the focal point of the object lens 1 to a target track on the recording surface of the optical disc (the details will be described later). The flexible printed circuit board 10 is a board for electrically connecting the optical system and the object lens actuator 100 to an external control circuit . The laser diode 3 and the photo-detector 5 are attached to the flexible printed circuit board 10.

The object lens actuator 100 will be described referring to FIG. 1.

Figure 1:
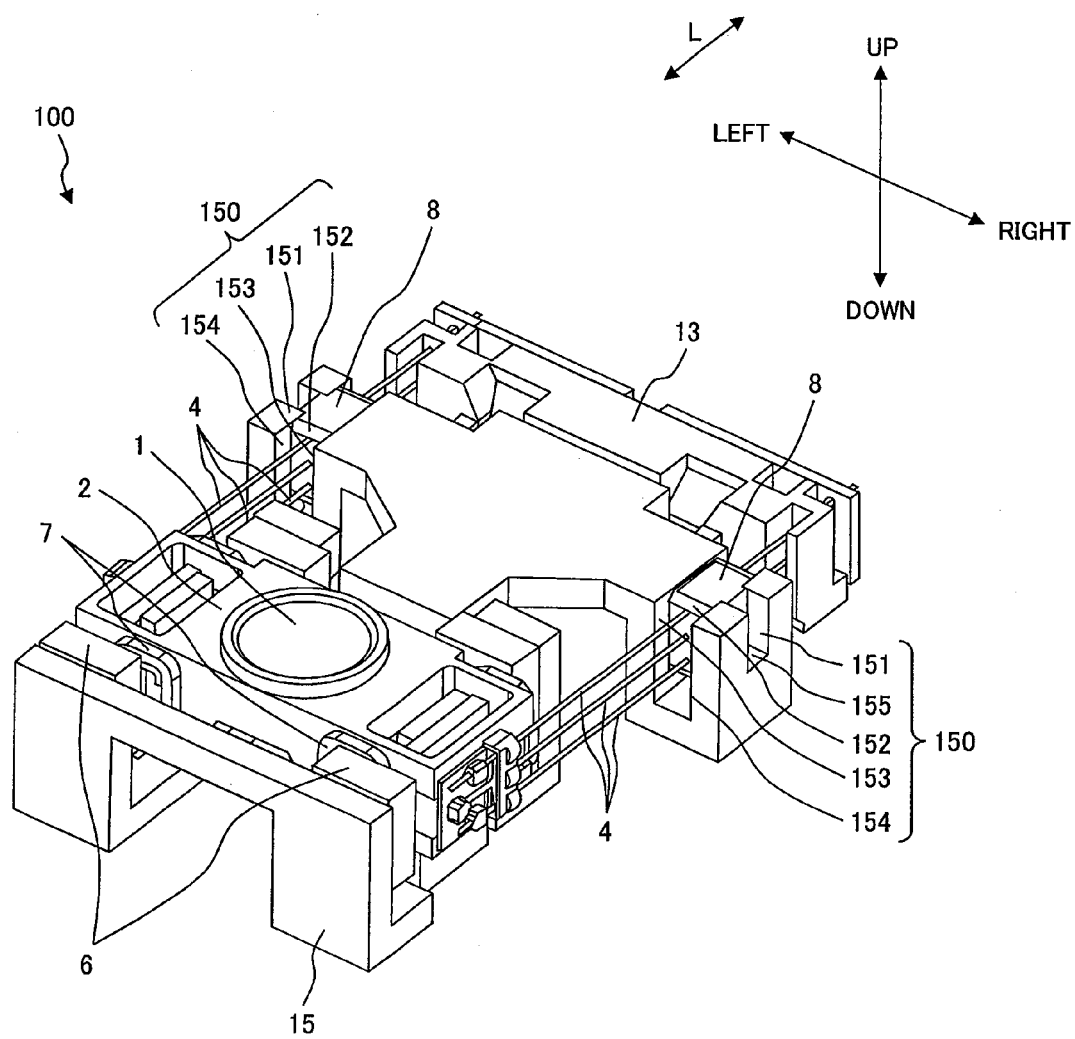
FIG. 1 is a schematic view of an object lens actuator of an optical pickup in accordance with a first embodiment of the present invention.

FIG. 1 is a schematic view of the object lens actuator 100 of the optical pickup in accordance with the first embodiment of the present invention.

In FIG. 1, the object lens actuator 100 includes a magnetic circuit having a yoke 15 and magnets 6, a moving part having a lens holder 2 which the object lens 1 and coils 7 are attached to, plural rod-shaped support members 4 disposed in the focusing direction, one end of each of the support members being attached to each of side surfaces of the moving part in the tracking direction, and a fixing part 13 for fixing the other end of each of the support members 4.

The yoke 15 extends toward the fixing part 13 along the longitudinal direction L of the support members 4, and includes gel holding parts 150 on both sides of the extending part in the tracking direction. Each of the gel holding parts 150 is U-shaped, having an opening 152 in a face on the optical disc side in the focusing direction, being integrated in the yoke 15, and having a shape such that gel 8 tends to stay.

The details of the gel holding parts 150 will be described referring to FIG. 2 and FIG. 3.

Figure 2:
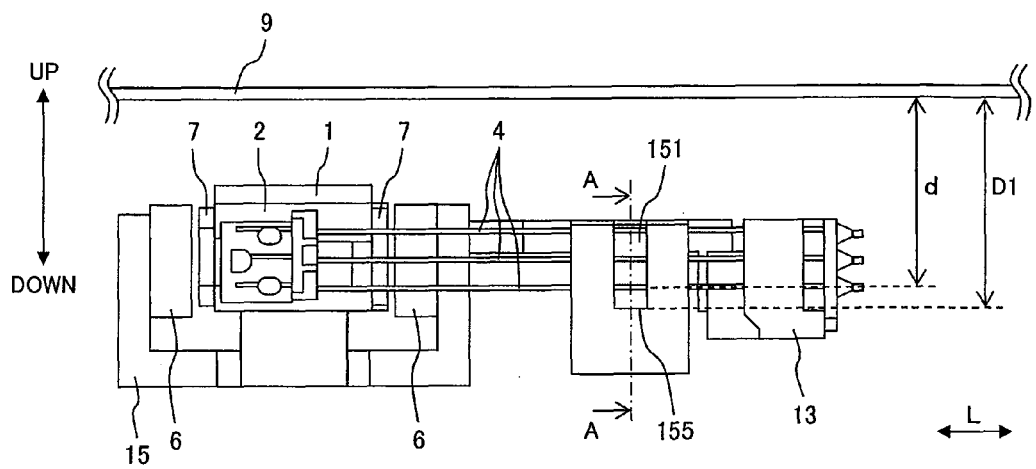
FIG. 2 is a side view of the object lens actuator of the optical pickup in accordance with the first embodiment of the present invention.

FIG. 2 is a side view of the object lens actuator 100 of the optical pickup in accordance with the first embodiment of the present invention.

Figure 3:
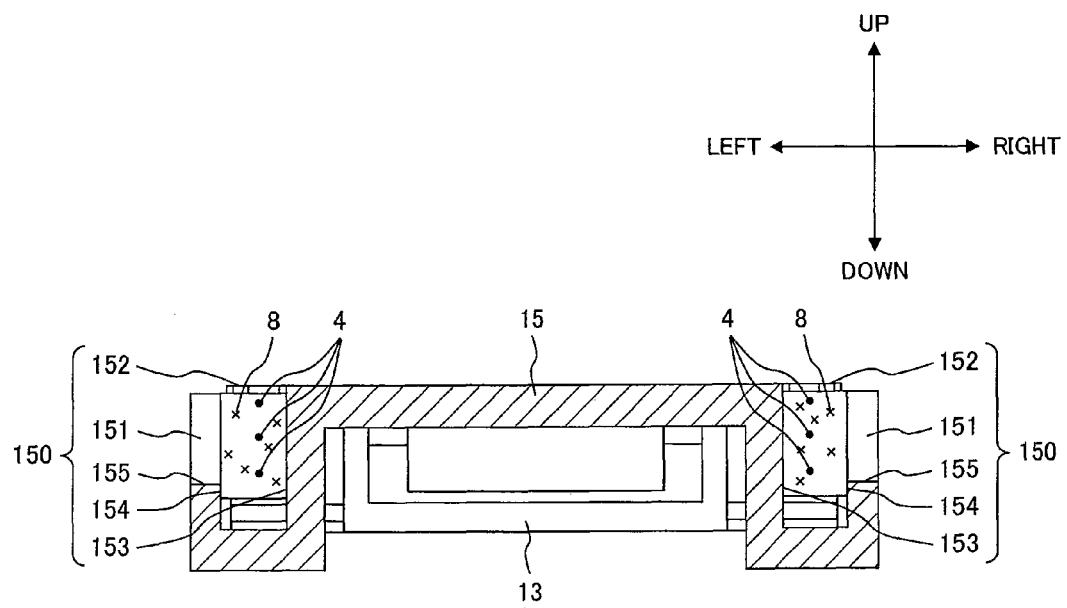
FIG. 3 is a cross-sectional view of the object lens actuator of the optical pickup in accordance with the first embodiment of the present invention.

FIG. 3 is a cross-sectional view of the object lens actuator 100 of the optical pickup in accordance with the first embodiment of the present invention with the present invention, taken from chain line A-A of FIG. 2.

As shown in FIG. 2 or FIG. 3, each of the gel holding parts 150 includes the opening 152 in the face on the optical disc 9 side in the focusing direction, walls 153, 154 on both sides of the support members 4 in the tracking direction, the support members 4 being disposed on both sides in the tracking direction, and a cutout 151 in the wall 154 which is located farther from the object lens 1 in the tracking direction, the cutout 151 extending from an edge of the opening 152. The gel 8 applied to the gel holding parts 150 tightly adheres to the both walls 153, 154 and encloses the support members 4, thereby damping the amplitude of the translational mode of the moving part, decided by the mass of the moving part and the rigidity of the support members 4.

Next, with reference to FIG. 2, the depth of the cutout 151 included in the wall 154 of each of the gel holding parts 150 will be described. Note that the gel 8 is not illustrated in FIG. 2 in order to clarify the position of the support members 4 in the focusing direction.

In FIG. 2, the distance D1 between a bottom surface 155 of the cutout 151 and the optical disc 9 is longer than the distance d between the optical disc 9 and one of the support members 4 which is located farthest away from the optical disc 9 in the focusing direction in the object lens actuator 100 of the present embodiment . Therefore, all of the plural support members 4 disposed in the focusing direction are visible when the inside of each of the gel holding parts 150 is looked in from the cutout 151 in the tracking direction.

The present embodiment has following three features with respect to the gel holding parts 150.

The first feature is that each of the gel holding parts 150 has an apertured face on the optical disc 9 side in the focusing direction, thereby having the opening 152.

The second feature is that each of the gel holding parts 150 has the cutout 151 in the wall 154 which is located farther from the object lens 1 in the tracking direction. The cutout 151 extends from the opening 152.

The third feature is that the distance D1 between the bottom surface 155 of the cutout 151 and the optical disc 9 is longer than the distance d between the optical disc 9 and one of the support members which is located farthest away from the optical disc 9 in the focusing direction.

Due to the first and second features, simultaneous applying of the gel 8, which is performed in a manner crossing all of the plural support members 4 disposed in the focusing direction, can be performed from one direction along the cutout 151 in the focusing direction. Further, batch irradiation with the ultraviolet light, which is performed for hardening the surface of the gel 8 applied to both two sides of the object lens 1 in the tracking direction, can also be performed from one direction in the focusing direction.

These features bring advantages that assembling can be simplified and variation of the work can be reduced because a series of works from applying to hardening of the gel 8 can be performed without changing the posture of the object lens actuator 100. Therefore, variation in the applying condition of the gel 8 to the support members 4 is reduced, and the amplitude of the translational mode of the moving part, decided by the rigidity of the support members 4 and the mass of the moving part, can be surely damped. In addition, due to the third feature, certainty of applying of the gel 8 to all of the plural support members 4 disposed in the focusing direction more improves, and variation in the applying condition of the gel 8 to the support members 4 is more reduced. Accordingly, the amplitude of the translational mode of the moving part, decided by the rigidity of the support members 4 and the mass of the moving part, can be more surely damped.

Thus, the present embodiment can provide an optical pickup with small variation of performance at a low cost.

[Second Embodiment]

In the present embodiment, an optical pickup will be described in which the gel holding parts are integrated in the fixing part instead of in the yoke.

Figure 4:
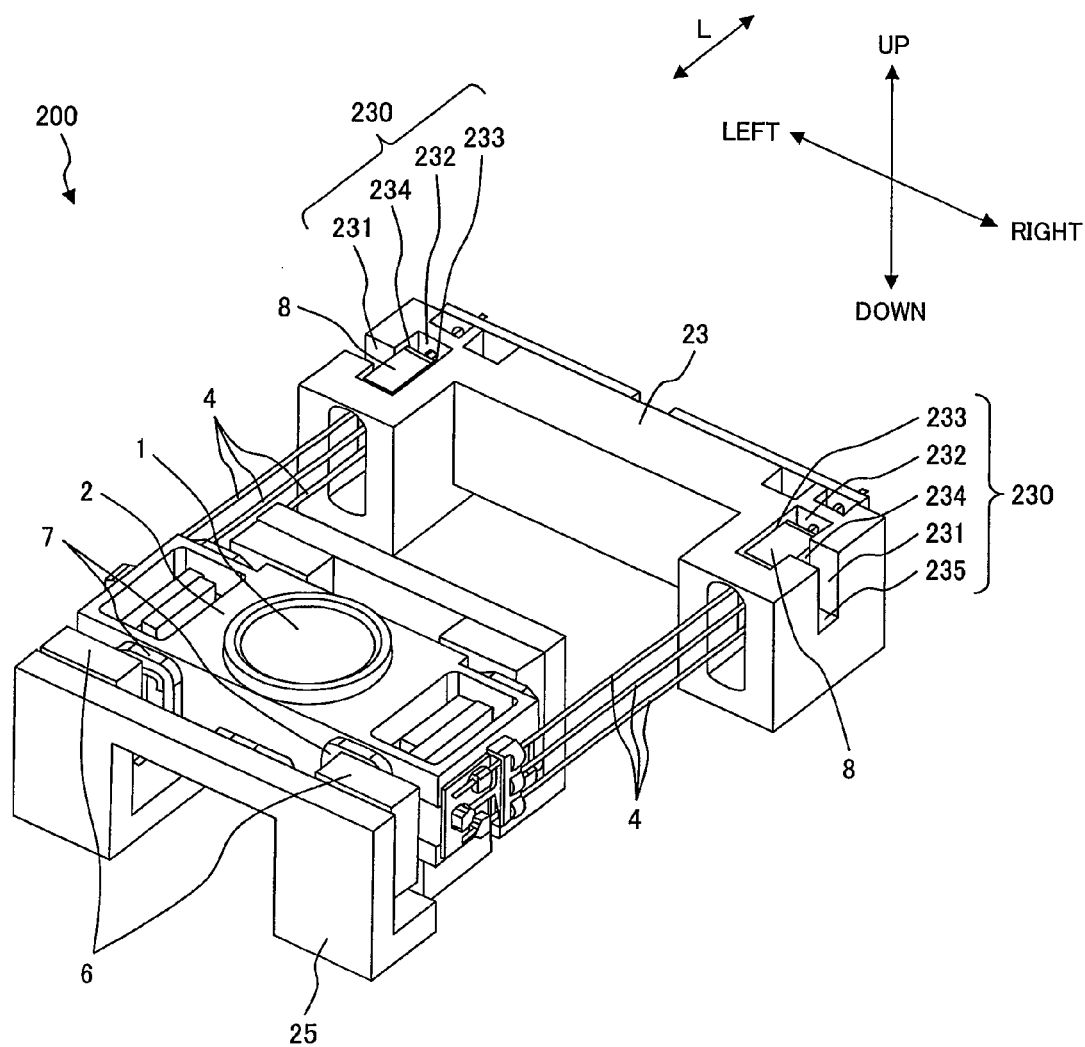
FIG. 4 is a schematic view of an object lens actuator of an optical pickup in accordance with a second embodiment of the present invention.

FIG. 4 is a schematic view of an object lens actuator 200 of an optical pickup in accordance with a second embodiment of the present invention. Description will be omitted for elements of the object lens actuator 200 in FIG. 4 having the same reference numerals and same functions as those in FIG. 1.

In FIG. 4, the object lens actuator 200 includes a fixing part 23 in which both right and left sides extend toward the moving part along the longitudinal direction L of the support members 4, and gel holding parts 230 are integrated in the fixing part 23 at the extending parts.

Each of the gel holding parts 230 includes an opening 232 in a face on the optical disc side in the focusing direction, walls 233, 234 on both sides of the support members 4 in the tracking direction, the support members 4 being disposed on both sides in the tracking direction, and a cutout 231 in the wall 234 which is located farther from the object lens 1 in the tracking direction, the cutout 231 extending from an edge of the opening 232. The gel 8 applied to the gel holding parts 230 tightly adheres to the both walls 233, 234 and encloses the support members 4, thereby damping the amplitude of the translational mode of the moving part, decided by the mass of the moving part and the rigidity of the support members 4.

Figure 5:
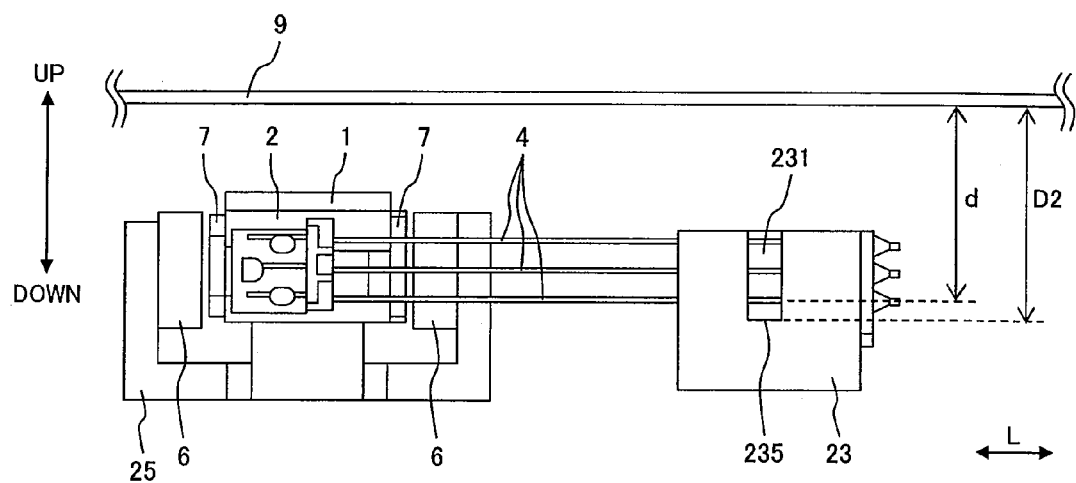
FIG. 5 is a side view of the object lens actuator of the optical pickup in accordance with the second embodiment of the present invention.

With reference to FIG. 5, the depth of the cutout 231 included in the wall 234 of each of the gel holding parts 230 will be described.

FIG. 5 is a side view of the object lens actuator 200 of the optical pickup in accordance with the second embodiment of the present invention. Note that the gel 8 is not illustrated in FIG. 5 in order to clarify the position of the support members 4 in the focusing direction.

In FIG. 5, the distance D2 between a bottom surface 235 of the cutout 231 and the optical disc 9 is longer than the distance d between the optical disc 9 and one of the support members which is located farthest away from the optical disc 9 in the focusing direction in the object lens actuator 200 of the present embodiment. Therefore, all of the plural support members 4 disposed in the focusing direction are visible when the inside of each of the gel holding parts 230 is looked in from the cutout 231 in the tracking direction.

The present embodiment has following three features with respect to the gel holding parts 230.

The first feature is that each of the gel holding parts 230 has the opening 232 in the upper face.

The second feature is that each of the gel holding parts 230 has the cutout 231 in the wall 234 which is located farther from the object lens 1 in the tracking direction. The cutout 231 extends from an edge of the opening 232.

The third feature is that the distance D2 between the bottom surface 235 of the cutout 231 and the optical disc 9 is longer than the distance d between the optical disc 9 and the support member which is located at the bottom among the support members 4 in the focusing direction.

Due to the first and second features, simultaneous applying of the gel 8, which is performed in a manner crossing all of the plural support members 4 disposed in the focusing direction, can be performed from one direction along the cutout 231 in the focusing direction. Further, batch irradiation with the ultraviolet light, which is performed for hardening the surface of the gel 8 applied to both two sides of the object lens 1 in the tracking direction, can also be performed from one direction in the focusing direction. These features bring advantages that assembling can be simplified and variation of the work can be reduced because a series of works from applying to hardening of the gel 8 can be performed without changing the posture of the optical pickup.

Therefore, variation in the applying condition of the gel 8 to the support members 4 is reduced, and the amplitude of the translational mode of the moving part, decided by the rigidity of the support members 4 and the mass of the moving part, can be surely damped. In addition, due to the third feature, certainty of applying of the gel 8 to all of the plural support members 4 disposed in the vertical direction more improves, and variation in the applying condition of the gel 8 to the support members 4 is more reduced. Accordingly, the amplitude of the translational mode of the moving part, decided by the rigidity of the support members 4 and the mass of the moving part, can be more surely damped.

As described above, according to the embodiments of the present invention, firstly, simultaneous applying of the gel, which is performed in a manner crossing all of the plural support members disposed in the focusing direction, can be performed from one direction along the cutout in the focusing direction. Further, batch irradiation with the ultraviolet light, which is performed for hardening the surface of the gel applied to both two sides of the object lens in the tracking direction, can also be performed from one direction in the focusing direction. That is, assembling can be simplified and variation of the work can be reduced because a series of works from applying to hardening of the gel can be performed without changing the posture of the optical pickup.

Secondly, certainty of applying of the gel to all of the plural support members disposed in the focusing direction improves, and variation in the applying condition of the gel to the support members is reduced. That is, the amplitude of the translational mode of the moving part, decided by the rigidity of the support members and the mass of the moving part, can be surely damped. Therefore, an optical pickup with small variation of performance can be provided at a low cost.

What is claimed is:

1. An optical pickup comprising:
    an object lens for forming a laser spot on a recording surface of an optical disc;
    a moving part including a lens holder to which the object lens and one or more coils are attached;
    a plurality of rod-shaped support members disposed in a focusing direction, each of the support members has a first end and a second end, the support members being disposed on both sides of the moving part in the tracking direction, the first end of each of the support members being attached to respective side surfaces of the moving part in a tracking direction;
    the second end of each of the support members being attached to a fixing part for fixing the second end of each of the support members;
    one or more magnets attached to a yoke, each of the magnets are disposed facing the coils; and
    gel holding parts, each of the gel holding parts including walls on both sides of the support members in the tracking direction,
    wherein each of the gel holding parts include one opening in the focusing direction on an optical disc side and include a cutout in the wall located farther from the object lens in the tracking direction, the cutout extending from an edge of the one opening.

2. The optical pickup according to claim 1,
    wherein the gel holding parts are integrated in the yoke at both ends of the yoke in the tracking direction.

3. The optical pickup according to claim 1,
wherein the gel holding parts are integrated in the fixing part at both ends of the fixing part in the tracking direction.

4. The optical pickup according to claim 1,
wherein a distance between a bottom surface of the cutout and the optical disc is longer than a distance between the optical disc and one of the support members which is located farthest away from the optical disc in the focusing direction.

* * * * *